United States Patent
Lee et al.

(10) Patent No.: US 9,846,546 B2
(45) Date of Patent: Dec. 19, 2017

(54) METHOD AND APPARATUS FOR STORING IMAGE

(71) Applicant: Hanwha Techwin Co., Ltd., Changwon-si (KR)

(72) Inventors: Howoong Lee, Changwon-si (KR); Hyunjoong Kong, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 202 days.

(21) Appl. No.: 14/893,659

(22) PCT Filed: Jun. 17, 2014

(86) PCT No.: PCT/KR2014/005287
§ 371 (c)(1),
(2) Date: Nov. 24, 2015

(87) PCT Pub. No.: WO2014/204167
PCT Pub. Date: Dec. 24, 2014

(65) Prior Publication Data
US 2016/0124667 A1    May 5, 2016

(30) Foreign Application Priority Data
Jun. 20, 2013  (KR) .......................... 10-2013-0071168

(51) Int. Cl.
*G06F 3/06* (2006.01)
*H04N 5/77* (2006.01)

(52) U.S. Cl.
CPC ............ *G06F 3/0619* (2013.01); *G06F 3/061* (2013.01); *G06F 3/0631* (2013.01);
(Continued)

(58) Field of Classification Search
CPC .... G06F 3/0619; G06F 3/0673; G06F 3/0655; G06F 3/061; G06F 3/0631; H04N 5/77
See application file for complete search history.

(56) References Cited

U.S. PATENT DOCUMENTS 7,248,776 B2 * 7/2007 Boston .................... H04N 5/76
386/230
7,295,753 B2 * 11/2007 Boston .................... H04N 5/76
386/318

(Continued)

FOREIGN PATENT DOCUMENTS

| JP | 2013-84049 A | 5/2013 |
| KR | 10-2004-0041384 A | 5/2004 |

(Continued)

OTHER PUBLICATIONS

International Search Report (PCT/ISA/210) dated Sep. 22, 2014, issued in the International Application No. PCT/KR2014/005287.
(Continued)

*Primary Examiner* — Christopher D Birkhimer
(74) *Attorney, Agent, or Firm* — Sughrue Mion, PLLC

(57) ABSTRACT

The inventive concept relates to a method for storing an image. The method includes: initially allocating an entire memory equally to a predetermined number of channels set to perform pre-recording for a first time period or a second time period shorter than the first time period when an event occurs; counting an event occurrence number from image signals input to the channels for a predetermined time period; and reallocating memory regions allocated to the respective channels, according to the event occurrence number and image signal storage states of the memory regions.

19 Claims, 6 Drawing Sheets

(52) U.S. Cl.
CPC .......... *G06F 3/0655* (2013.01); *G06F 3/0673* (2013.01); *H04N 5/77* (2013.01)

(56) References Cited

U.S. PATENT DOCUMENTS

| | | | | |
|---|---|---|---|---|
| 7,366,398 | B2* | 4/2008 | Boston | H04N 5/76 386/248 |
| 7,433,582 | B2* | 10/2008 | Boston | H04N 5/76 386/240 |
| 7,474,832 | B2* | 1/2009 | Boston | G11B 19/00 386/294 |
| 7,529,471 | B2* | 5/2009 | Boston | G11B 19/00 386/291 |
| 7,532,809 | B2* | 5/2009 | Boston | G11B 19/00 386/294 |
| 8,103,788 | B1* | 1/2012 | Miranda | G06F 13/385 709/224 |
| 8,364,023 | B2* | 1/2013 | Boston | G11B 19/00 386/294 |
| 8,384,830 | B2 | 2/2013 | Tullberg | |
| 8,392,510 | B2* | 3/2013 | Boston | H04N 5/76 386/248 |
| 8,396,352 | B2* | 3/2013 | Boston | G11B 19/00 386/293 |
| 8,412,783 | B2* | 4/2013 | Boston | H04N 5/76 386/248 |
| 8,417,781 | B2* | 4/2013 | Boston | H04N 5/76 386/322 |
| 8,571,387 | B2* | 10/2013 | Boston | H04N 5/76 386/292 |
| 8,818,162 | B2* | 8/2014 | Boston | G11B 19/00 386/200 |
| 8,849,099 | B2* | 9/2014 | Boston | H04N 5/76 386/326 |
| 8,867,904 | B2* | 10/2014 | Boston | G11B 19/00 386/294 |
| 2002/0005895 | A1* | 1/2002 | Freeman | H04N 5/772 348/143 |
| 2002/0150123 | A1* | 10/2002 | Ro | H04N 5/21 370/465 |
| 2003/0235392 | A1* | 12/2003 | Boston | H04N 5/76 386/328 |
| 2003/0235393 | A1* | 12/2003 | Boston | H04N 5/76 386/295 |
| 2003/0235394 | A1* | 12/2003 | Boston | H04N 5/76 386/295 |
| 2003/0235395 | A1* | 12/2003 | Boston | G11B 19/00 386/262 |
| 2003/0235396 | A1* | 12/2003 | Boston | H04N 5/76 386/262 |
| 2003/0237085 | A1* | 12/2003 | Boston | G11B 19/00 725/1 |
| 2003/0237086 | A1* | 12/2003 | Boston | G11B 19/00 725/1 |
| 2003/0237090 | A1* | 12/2003 | Boston | H04N 5/76 725/37 |
| 2004/0101271 | A1* | 5/2004 | Boston | G11B 19/00 386/295 |
| 2006/0161755 | A1* | 7/2006 | Uchikawa | G06F 9/5016 711/170 |
| 2007/0280631 | A1* | 12/2007 | Boston | H04N 5/76 386/295 |
| 2007/0283382 | A1* | 12/2007 | Boston | H04N 5/76 725/32 |
| 2007/0286566 | A1* | 12/2007 | Boston | H04N 5/76 386/291 |
| 2007/0286581 | A1* | 12/2007 | Boston | H04N 5/76 386/294 |
| 2008/0013919 | A1* | 1/2008 | Boston | G11B 19/00 386/291 |
| 2008/0069126 | A1* | 3/2008 | Howcroft | H04N 5/76 370/412 |
| 2008/0172688 | A1* | 7/2008 | Boston | G11B 19/00 725/1 |
| 2008/0212946 | A1* | 9/2008 | Boston | G11B 19/00 386/262 |
| 2008/0232783 | A1* | 9/2008 | Boston | H04N 5/76 386/292 |
| 2009/0074380 | A1* | 3/2009 | Boston | G11B 19/00 386/295 |
| 2009/0136206 | A1* | 5/2009 | Aisu | H04N 7/163 386/292 |
| 2010/0310236 | A1 | 12/2010 | Lee | |
| 2014/0362698 | A1* | 12/2014 | Arad | H04W 16/04 370/235 |

FOREIGN PATENT DOCUMENTS

| | | |
|---|---|---|
| KR | 10-2004-0079164 A | 9/2004 |
| KR | 10-2005-0099830 A | 10/2005 |
| KR | 10-2007-0082620 A | 8/2007 |
| KR | 10-2008-0007141 A | 1/2008 |
| KR | 10-2008-0012664 A | 2/2008 |
| KR | 10-2008-0087751 A | 10/2008 |

OTHER PUBLICATIONS

Written Opinion (PCT/ISA/237) dated Sep. 22, 2014, issued in the International Application No. PCT/KR2014/005287.

* cited by examiner

METHOD AND APPARATUS FOR STORING IMAGE

TECHNICAL FIELD

The inventive concept relates to image storing methods and apparatuses for dynamically allocating a memory to record pre-recording image signals when an event occurs.

BACKGROUND ART

When an event occurs, an image monitoring system performs a pre-event recording function for recording an image at the previous time of occurrence of the event. In order to perform the pre-event recording function, a pre-recording memory is provided for each channel to record an input image signal. In this case, when an image signal having a large data amount is input, there is a limit to the memory size. Therefore, an image signal of a certain period at the most previous time is deleted and a new image signal is recorded to ensure recording for a short time. Like this, in the related art, since the pre-recording memory provided for each channel has a limited capacity, when an image signal having a high data rate is input, the image recording time is reduced. Also, it is inefficient because a pre-recording memory is provided even for a channel that is not currently used.

DETAILED DESCRIPTION OF THE INVENTION

Technical Problem

The inventive concept is to provide image storing methods that may maximally reduce image signal loss by dynamically allocating a memory to record pre-recording image signals when an event occurs.

Technical Solution

According to an aspect of the inventive concept, a method for storing an image includes: initially allocating an entire memory equally to a predetermined number of channels set to perform pre-recording for a first time period or a second time period shorter than the first time period when an event occurs, and recording image signals; counting an event occurrence number from image signals input to the channels for a predetermined time period; reallocating memory regions allocated to the respective channels, according to the event occurrence number and image signal storage states of the memory regions; and storing image signals recorded in the memory regions, in a hard disk.

The reallocating of the memory regions may include: checking the capacity of the memory regions performing pre-recording for the first time period or the second time period; detecting the channel having the smallest event occurrence number; reducing the memory region allocated to the channel having the smallest event occurrence number when the channel having a memory region capacity excess exists; and reallocating the remaining memory region corresponding to the subtraction result between the reduced memory region and the memory region allocated initially to the channel having the smallest event occurrence number to the channel having the memory region capacity excess.

The reducing of the memory region may include changing the pre-recording performance time period from the first time period into the second time period with respect to the channel having the smallest event occurrence number and performing pre-recording for the first time period.

The reducing of the memory region may further include changing an image signal record state including an intra (I) frame and a predictive (P) frame into an I frame image signal record state with respect to the channel having the smallest event occurrence number and performing pre-recording for the second time period.

The method may further include checking the total memory capacity and, when the capacity remains, returning to a state before the memory region reallocation.

The returning to the state before the memory region reallocation may include: checking the total memory capacity and, when the capacity remains, changing an I frame image signal record state into an image signal record state including an I frame and a P frame with respect to the channel having the smallest event occurrence number; checking the total memory capacity after the change into the image signal record state including the I frame and the P frame and, when the capacity remains, changing the image signal record state including the I frame and the P frame into a pre-recording performance state for the second time period with respect to the channel having the smallest event occurrence number; and checking the total memory capacity after the change into the pre-recording performance state for the second time period and, when the capacity remains, changing the pre-recording performance state for the second time period into a pre-recording performance state for the first time period with respect to the channel having the smallest event occurrence number.

The counting of the event occurrence number may include allocating a weight to each event and counting the event occurrence number according to the weight.

According to another aspect of the inventive concept, an apparatus for storing an image includes: a control unit configured to initially allocate an entire memory equally to a predetermined number of channels set to perform pre-recording for a first time period or a second time period shorter than the first time period when an event occurs, and record image signals in respective memory regions; an event processing unit configured to count an event occurrence number from image signals input to the channels for a predetermined time period; and a dynamic memory allocating unit configured to reallocate memory regions allocated to the respective channels, according to the event occurrence number and image signal storage states of the memory regions, wherein the control unit is configured to store image signals recorded in the memory regions, in a hard disk.

The dynamic memory allocating unit may check the capacity of the memory regions performing pre-recording for the first time period or the second time period, detect the channel having the smallest event occurrence number, reduce the memory region allocated to the channel having the smallest event occurrence number when the channel having a memory region capacity excess exists, and reallocate the remaining memory region corresponding to the subtraction result between the reduced memory region and the memory region allocated initially to the channel having the smallest event occurrence number to the channel having the memory region capacity excess.

The reducing of the memory region may be changing the pre-recording performance time period from the first time period into the second time period with respect to the channel having the smallest event occurrence number and performing pre-recording for the first time period.

The reducing of the memory region may be changing an image signal record state including an I frame and a P frame into an I frame image signal record state with respect to the channel having the smallest event occurrence number and performing pre-recording for the second time period.

The dynamic memory allocating unit may check the total memory capacity and, when the capacity remains, return to a state before the memory region reallocation.

The dynamic memory allocating unit may check the total memory capacity and, when the capacity remains, change an I frame image signal record state into an image signal record state including an I frame and a P frame with respect to the channel having the smallest event occurrence number, check the total memory capacity after the change into the image signal record state including the I frame and the P frame and, when the capacity remains, change the image signal record state including the I frame and the P frame into a pre-recording performance state for the second time period with respect to the channel having the smallest event occurrence number, and check the total memory capacity after the change into the pre-recording performance state for the second time period and, when the capacity remains, change the pre-recording performance state for the second time period into a pre-recording performance state for the first time period with respect to the channel having the smallest event occurrence number.

The event processing unit may allocate a weight to each event and count the event occurrence number according to the weight.

BEST MODE

Figure 1:
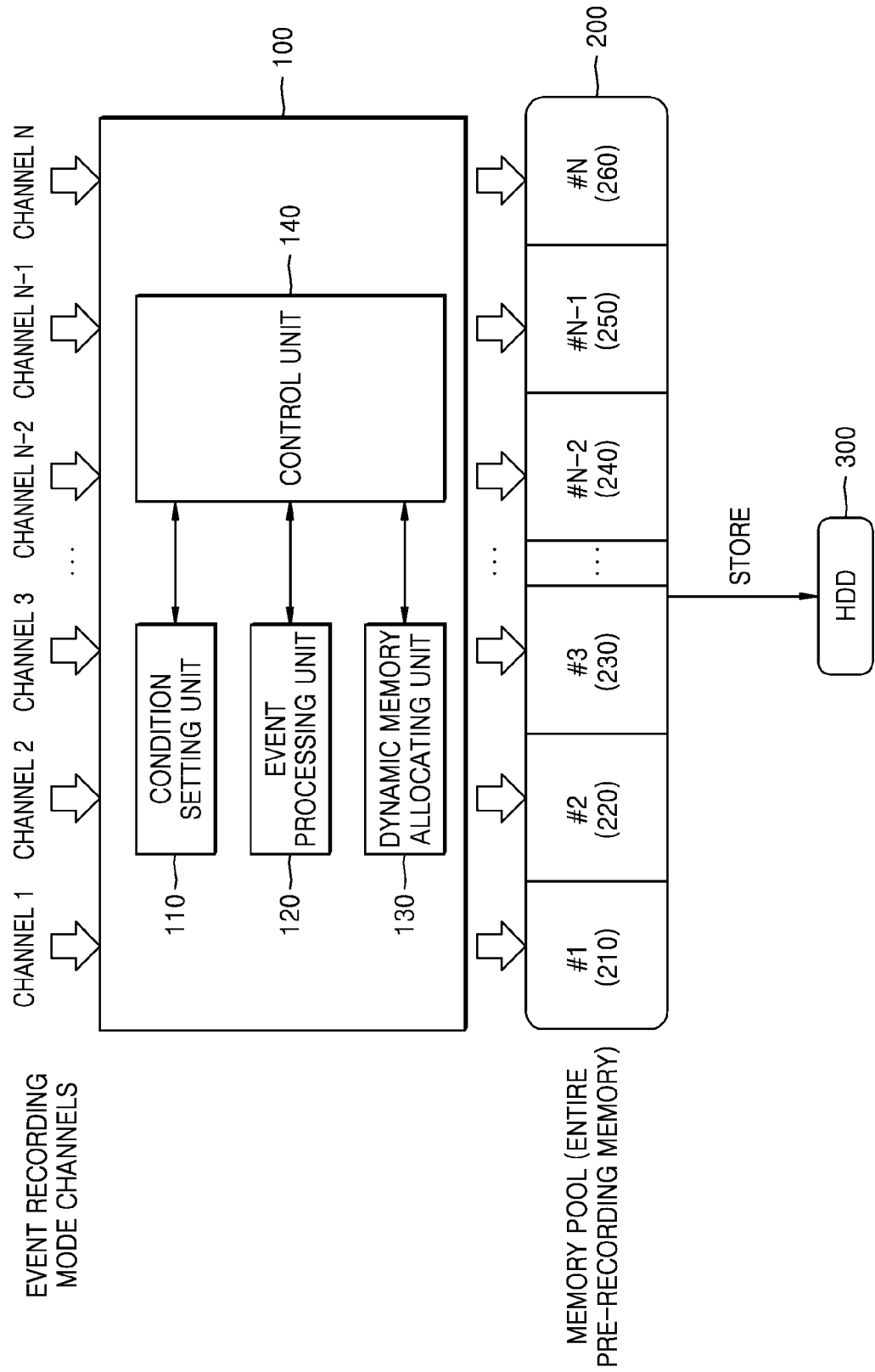
FIG. 1 is a block diagram illustrating a configuration of an image storing apparatus according to an exemplary embodiment of the inventive concept.

According to an exemplary embodiment of the inventive concept, a method for storing an image includes: initially allocating an entire memory equally to a predetermined number of channels set to perform pre-recording for a first time period or a second time period shorter than the first time period when an event occurs, and recording image signals; counting an event occurrence number from image signals input to the channels for a predetermined time period; reallocating memory regions allocated to the respective channels, according to the event occurrence number and image signal storage states of the memory regions; and storing image signals recorded in the memory regions, in a hard disk.

MODE OF THE INVENTION

The inventive concept may include various embodiments and modifications, and exemplary embodiments thereof are illustrated in the drawings and will be described herein in detail. However, it will be understood that the inventive concept is not limited to the exemplary embodiments and includes all modifications, equivalents, and substitutions falling within the spirit and scope of the inventive concept. In the following description, detailed descriptions of well-known functions or configurations will be omitted since they would unnecessarily obscure the subject matters of the inventive concept.

Although terms such as "first" and "second" may be used herein to describe various elements or components, these elements or components should not be limited by these terms. These terms are only used to distinguish one element or component from another element or component.

The terms used herein are for the purpose of describing exemplary embodiments only and are not intended to limit the inventive concept. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

The exemplary embodiments may be described in terms of functional block components and various processing operations. Such functional blocks may be implemented by any number of hardware and/or software components that execute particular functions. For example, the exemplary embodiments may employ various integrated circuit (IC) components, such as memory elements, processing elements, logic elements, and lookup tables, which may execute various functions under the control of one or more microprocessors or other control devices. Similarly, where the elements of the exemplary embodiments may be implemented by software programming or software elements, the exemplary embodiments may be implemented by any programming or scripting language such as C, C++, Java, or assembly language, with various algorithms being implemented by any combination of data structures, processes, routines, or other programming elements. Functional aspects may be implemented by an algorithm that is executed in one or more processors. Also, the exemplary embodiments may employ the related art for electronic environment setting, signal processing, and/or data processing. Terms such as "mechanism", "element", "unit", and "configuration" may be used in a broad sense, and are not limited to mechanical and physical configurations. The terms may include the meaning of software routines in conjunction with processors or the like.

Hereinafter, exemplary embodiments of the inventive concept will be described in detail with reference to the accompanying drawings. In the following description, like reference numerals will be used to denote like elements, and redundant descriptions thereof will be omitted for conciseness.

FIG. 1 is a block diagram illustrating a configuration of an image storing apparatus according to an exemplary embodiment of the inventive concept.

Referring to FIG. 1, the image storing apparatus may include an image signal processing unit 100, a memory pool 200 as an entire pre-recording memory, and a hard disk 300.

The image signal processing unit 100 may initially allocate the memory pool 200 equally to a predetermined number of channels set to perform pre-recording for a first time period or a second time period shorter than the first time period when an event occurs, and record image signals therein. The image signal processing unit 100 may count an event occurrence number from image signals input to the channels for a predetermined time period, reallocate memory regions allocated to the respective channels, according to the event occurrence number and image signal storage states of the memory regions, and store image signals recorded in the memory regions, in the hard disk 300.

The memory pool 200 may be a virtual memory space obtained by setting the entire pre-recording memory as one memory space. In the following claims, the memory pool 200 is described as an entire memory divided into a plurality of memory regions. In the related art, since a pre-recording memory is provided for each channel and has a limited record capacity, when an image signal having a high data rate is input, the image recording time is reduced. Also, it is inefficient because a pre-recording memory is provided even for a channel that is not currently used. However, by introducing the memory pool 200, the inventive concept may initially allocate memory regions 210 to 260 equally to the channels, which are set to perform pre-recording, and dynamically allocate (i.e., reallocate) the allocated memory regions mainly to the channels, to which high-resolution image signals are input, to record the image signals, thereby making it possible to maximally reduce image signal loss.

Hereinafter, the dynamic allocation of the memory pool 200 will be described in detail in conjunction with the image signal processing unit 100. In the present exemplary embodiment, the image signal processing unit 100 may include a condition setting unit 110, an event processing unit 120, a dynamic memory allocating unit 130, and a control unit 140.

The condition setting unit 110 may set operation conditions for pre-recording in the case of occurrence of an event, which may be set by a user before the start of recording. The operation conditions set by the condition setting unit 110 may include, for example, a first pre-recording time period, a second pre-recording time period, an entire pre-recording memory (memory pool 200; hereinafter, referred to as "memory") capacity, and the number of event recording channels.

Herein, the first pre-recording time period may refer to a time period for performing maximum pre-recording and may be, for example, but is not limited to, 15 seconds. When the first pre-recording time period is set, an image signal may be recorded in an allocated memory for up to 15 seconds in the case of occurrence of an event. Also, the second pre-recording time period may refer to a time period for performing minimum pre-recording and may be, for example, but is not limited to, 5 seconds. When the second pre-recording time period is set, an image signal may be recorded in an allocated memory for up to 5 seconds in the case of occurrence of an event. Also, the total memory capacity may refer to the capacity of the memory pool 200 and may be, for example, but is not limited to, 400 Mbytes. Also, the number of event recording channels may refer to the number of channels (among all channels) set to perform pre-recording in the case of occurrence of an event. Although set to "N" in FIG. 1, the number of event recording channels may be, for example, but is not limited to, "10". Hereinafter, for convenience of description, "event recording channels" will be referred to as "channels".

The control unit 140 may control the overall operation of the condition setting unit 110. In particular, when the setting of the total memory capacity and the number of channels is completed, the control unit 140 may initially allocate the memory capacity equally to the respective channels and perform a control operation so that the image signals input from the respective channels may be recorded in the initially-allocated memory regions. FIG. 1 illustrates the memory regions 210 to 260 that are initially allocated equally to the respective N channels. For example, when the condition setting unit 110 sets the total memory capacity to "400 Mbytes" and sets the number of channels to "10", the control unit 140 may initially allocate a 40-Mbyte memory region to each channel.

Under the control of the control unit 140, when the image signals start to be recorded in the memory regions allocated to the respective channels, the event processing unit 120 may count an event occurrence number from the image signals for a predetermined time period, for example, 1 minute. Herein, the event may refer to an event such as an audio detection about a particular object or a motion detection about a particular object from the image signal. For example, the event may include a system event set in a system, such as the occurrence of a network error or the setting of a new camera. Also, the event may include a user event set by the user, such as the appearance of an object, the generation of an image specified by the user (e.g., face recognition), the change of a screen color, the occurrence of a motion in a predetermined region, the generation of an abnormal sound source in the case of audio (e.g., car tire friction sound (skid), glass break sound, alarm sound, or collision sound), the generation of a sound source specified by the user (e.g., yell, scream, or cry), or the generation of a voice over a threshold value. The event processing unit 120 may count the event occurrence number for the predetermined time period by using the event detection result, and detect channels from the channel having the greatest event occurrence number to the channel having the smallest event occurrence number.

Under the control of the control unit 140, the event processing unit 120 may allocate a weight to each event to count the event occurrence number. For example, the event processing unit 120 may count the generation of a particular sound source three times as one event or may count the detection of a particular face once as two events. The weight for each event may vary according to embodiments.

The event processing unit 120 may count the event only in the case of occurrence of any possible initially-set event or an event set by the user.

Under the control of the control unit 140, the dynamic memory allocating unit 130 may reallocate the memory regions allocated initially to the respective channels, according to the event occurrence number and the image signal storage states of the memory regions allocated to the respective channels.

The dynamic memory allocating unit 130 may check the capacity of the memory regions performing pre-recording for the first time period, reduce the memory region allocated to the channel having the smallest event occurrence number in the case of existence of the channel having a memory region capacity excess, and reallocate the remaining memory region corresponding to the subtraction result between the reduced memory region and the memory region allocated initially to the channel having the smallest event occurrence number to the channel having the memory region capacity excess. Herein, the reducing of the memory region allocated to the channel having the smallest event occurrence number may include changing the pre-recording performance time period from the first time period into the second time period with respect to the channel having the smallest event occurrence number and performing pre-recording for the first time period.

Figure 2:
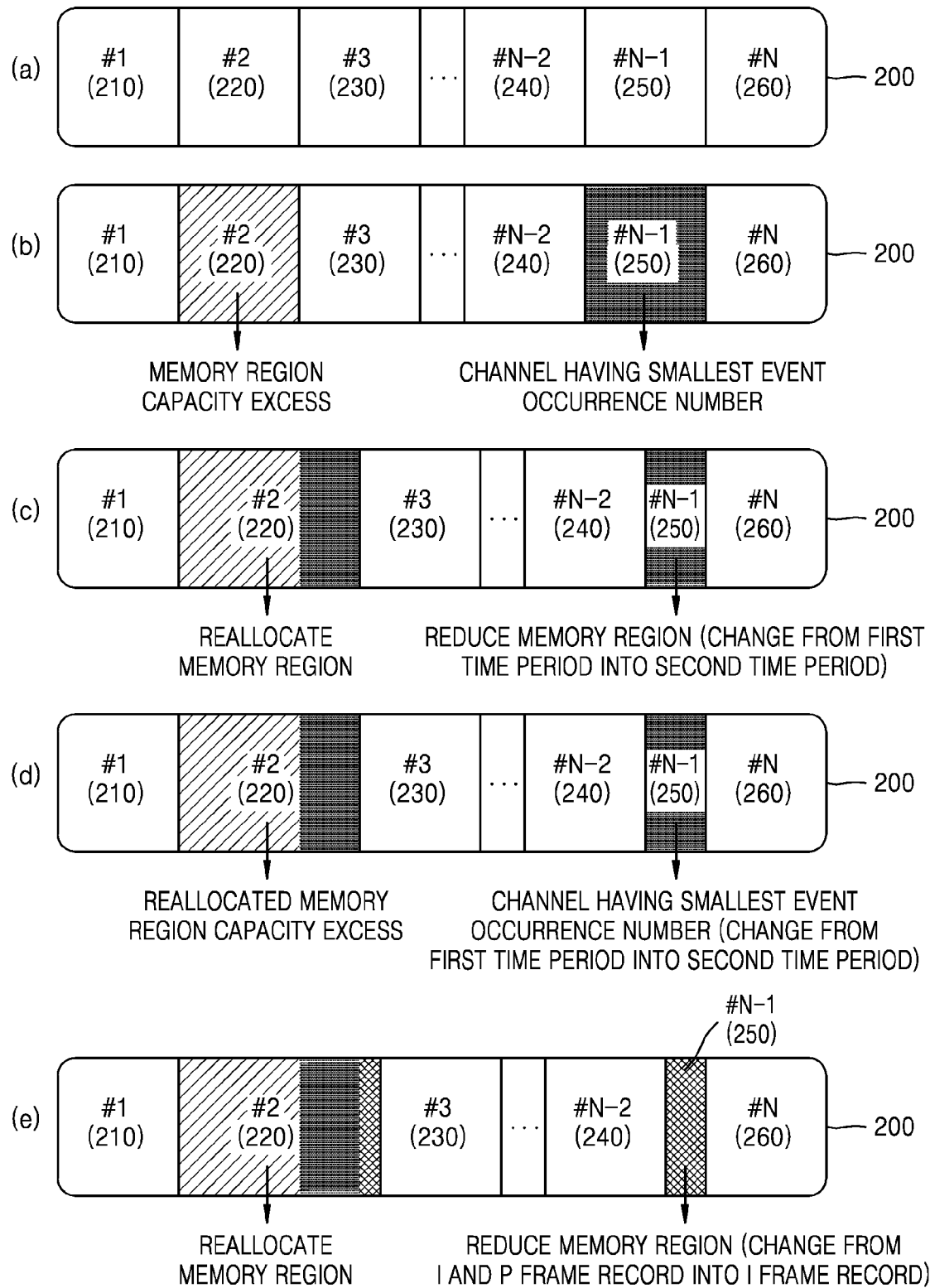
FIG. 2 is a diagram illustrating dynamic allocation of memory regions in FIG. 1.

FIG. 2 is a diagram illustrating the dynamic allocation of memory regions in FIG. 1. Referring to FIG. 2, FIG. 2A illustrates a state in which the memory capacity is initially allocated equally to the respective channels. FIG. 2B illustrates a state in which a capacity excess occurs in the memory region 220 of the second channel among the channels performing pre-recording for the first time period and that the (N−1)th channel is detected as the channel having the smallest event occurrence number. FIG. 2C illustrates that, by changing the pre-recording performance time period of the (N−1)th channel having the smallest event occurrence number from the first time period into the second time period, the memory region 250 of the (N−1)th channel is reduced and the memory region of the memory region 220 of the second channel is reallocated and expanded. Herein, the memory region reallocated to the second channel may be the remaining memory region corresponding to the subtraction result between the reduced memory region and the memory region allocated initially to the (N−1)th channel.

When determining that at least one of the set channels has a memory region capacity excess, the dynamic memory allocating unit 130 may change the pre-recording performance time period of the channel having the smallest event occurrence number from the first time period into the second time period by determining, for example, the channel having the smallest event occurrence number as the first priority order and the channel having the second-smallest event occurrence number as the second priority order, etc. Consequently, when the capacity of the image signals is large and thus all the channels have a memory region capacity excess, the pre-recording performance time period of all the channels is changed from the first time period into the second time period.

The dynamic memory allocating unit 130 may check the capacity of the memory regions performing pre-recording for the second time period, reduce the memory region allocated to the channel having the smallest event occurrence number in the case of existence of the channel having a memory region capacity excess, and reallocate the remaining memory region corresponding to the subtraction result between the reduced memory region and the memory region allocated initially to the channel having the smallest event occurrence number to the channel having the memory region capacity excess. Herein, the reducing of the memory region allocated to the channel having the smallest event occurrence number may include changing a pre-recording performance state, for example, changing a record state of an image signal including an intra (I) frame and a predictive (P) frame into a record state of an I frame image signal with respect to the channel having the smallest event occurrence number and performing pre-recording for the second time period.

Referring to FIG. 2, FIG. 2D illustrates a state in which a capacity excess occurs in the memory region 220 of the second channel among the channels performing pre-recording for the second time period and that the (N−1)th channel is detected as the channel having the smallest event occurrence number. FIG. 2E illustrates that, by changing the record state of the image signal including the I frame and the P frame into the record state of the I frame image signal, of the (N−1)th channel having the smallest event occurrence number and performing pre-recording for the second time period, the memory region 250 of the (N−1)th channel is reduced and the memory region of the memory region 220 of the second channel is reallocated and expanded. Herein, the memory region reallocated to the second channel may be the remaining memory region corresponding to the subtraction result between the reduced memory region and the memory region allocated to the (N−1)th channel performing pre-recording for the second time period.

The dynamic memory allocating unit 130 may check the total memory capacity and, when the capacity remains, return to the state before the memory region reallocation. In this case, the dynamic memory allocating unit 130 may check the total memory capacity and, when the capacity remains, change the pre-recording performance state, by changing, the record state of the I frame image signal for the second time period into the record state of the image signal including the I frame and the P frame for the second time period with respect to the channel having the smallest event occurrence number. Then, the dynamic memory allocating unit 130 may check the total memory capacity after the change into the image signal record state including the I frame and the P frame and, when the capacity remains, change the pre-recording performance state for the second time period into the pre-recording performance state for the first time period with respect to the channel having the smallest event occurrence number.

Like this, the image signal loss may be maximally reduced by dynamically allocating the memory to record the pre-recording image signals in the case of occurrence of an event.

Hereinafter, an image signal storing method according to an exemplary embodiment of the inventive concept will be described with reference to FIGS. 3 to 6. The image signal storing method according to the inventive concept may be performed by the image storing apparatus as illustrated in FIG. 1. According to an exemplary embodiment, the main algorithm of the operation method may be performed by the image signal processing unit 100 with the help of the peripheral components in the image storing apparatus. In the following description, redundant descriptions with respect to the descriptions of FIGS. 1 and 2 will be omitted for conciseness.

Figure 3:
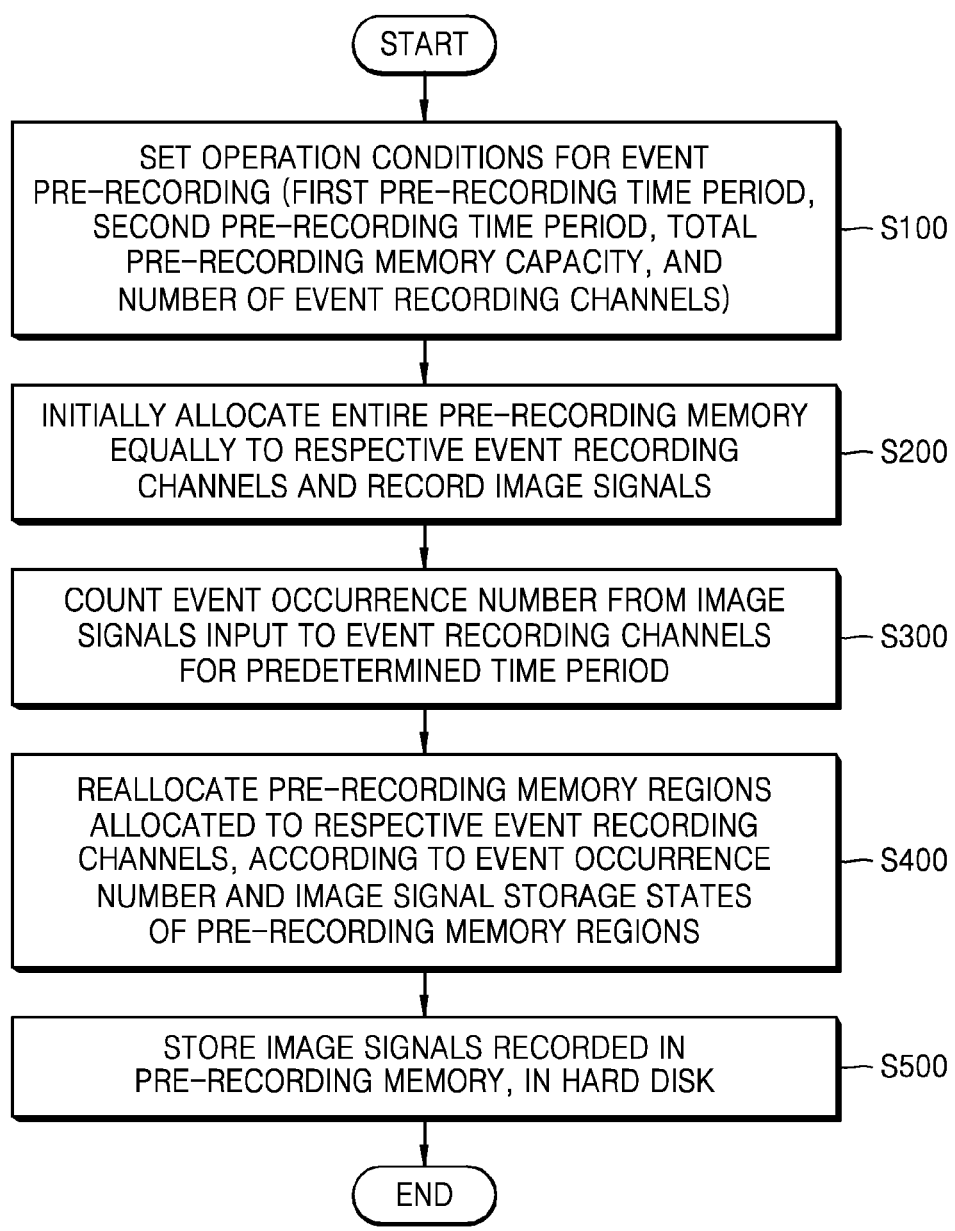
FIG. 3 is a flow diagram illustrating a process of an image storing method according to an exemplary embodiment of the inventive concept.

FIG. 3 is a flow diagram illustrating a process of an image storing method according to an exemplary embodiment of the inventive concept. Referring to FIG. 3, the image signal processing unit 100 may perform operation S100 of setting operation conditions for performing pre-recording in the case of occurrence of an event according to a signal input by the user. Herein, the operation conditions may include, for example, a first pre-recording time period, a second pre-recording time period, a total memory capacity, the number of channels, an event type, and a weight for each event. Since the operation conditions have been described above in detail, redundant descriptions thereof will be omitted for conciseness.

When the setting of the operation conditions is completed, the image signal processing unit 100 may perform operation S200 of initially allocating the memory capacity equally to the respective channels and recording the image signals input from the respective channels in the initially-allocated memory regions. For example, when the condition setting unit 110 sets the total memory capacity to "400 Mbytes" and sets the number of channels to "10", the control unit 140 may initially allocate a 40-Mbyte memory region to each channel.

When the image signals start to be recorded in the memory regions allocated to the respective channels, the image signal processing unit 100 may perform operation S300 of counting the event occurrence number from the image signals for a predetermined time period, for example, 1 minute. Herein, the event may refer to an event such as an audio detection about a particular object or a motion detection about a particular object from the image signal. The image signal processing unit 100 may count the event occurrence number for the predetermined time period and detect the channels such as from a channel having the greatest event occurrence number to a channel having the smallest event occurrence number. The image signal processing unit 100 may allocate a weight to each event and count the event occurrence number according to the event detection result. Also, the image signal processing unit 100 may count the event only in the case of occurrence of any possible initially-set event or an event set by the user.

Thereafter, the image signal processing unit 100 may perform operation S400 of reallocating the memory regions allocated initially to the respective channels, according to the event occurrence number and the image signal storage states of the memory regions allocated to the respective channels. The reallocation of the memory regions will be described with reference to FIGS. 4 to 6.

The image signal processing unit 100 may perform operation S500 of storing the image signals recorded after the reallocation of the memory regions, in the hard disk.

A method of reallocating the memory regions will be described below with reference to FIGS. 4 to 6.

Figure 4:
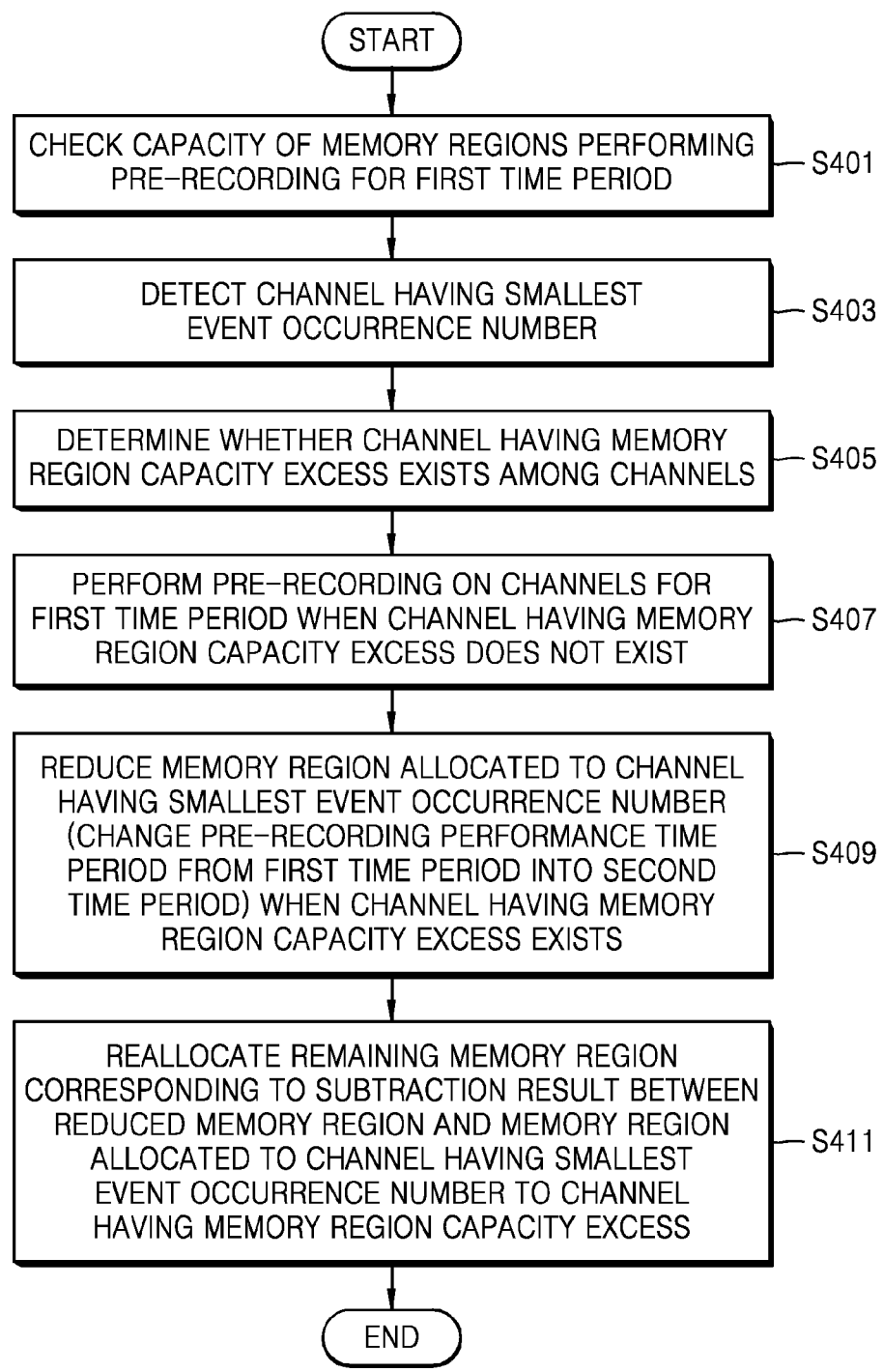
FIGS. 4 and 5 are flow diagrams illustrating a memory region reallocating method in FIG. 3.

Referring to FIG. 4, the image signal processing unit 100 may perform operation S401 of checking the capacity of the memory regions performing pre-recording for the first time period.

Also, the image signal processing unit 100 may perform operation S403 of checking the channel having the smallest event occurrence number.

As a result of checking the capacity of the memory regions, when the channel having a memory region capacity excess does not exist in operation S405, the image signal processing unit 100 may perform operation S407 for maintaining the current states of all the channels, that is, performing pre-recording for the first time period.

On the other hand, as a result of checking the capacity of the memory regions, when the channel having a memory region capacity excess exists in operation S405, the image signal processing unit 100 may perform operation S409 of reducing the memory region allocated to the channel having the smallest event occurrence number. Herein, the reducing of the memory region allocated to the channel having the smallest event occurrence number may include changing the pre-recording performance time period from the first time period into the second time period with respect to the channel having the smallest event occurrence number and performing pre-recording for the first time period.

When the reducing of the memory region allocated to the channel having the smallest event occurrence number is completed, the image signal processing unit 100 may perform operation S411 of reallocating the remaining memory region corresponding to the subtraction result between the reduced memory region and the memory region allocated initially to the channel having the smallest event occurrence number to the channel having the memory region capacity excess.

When determining that at least one of the set channels has a memory region capacity excess, the image signal processing unit 100 may change the pre-recording performance time period of the channel having the small event occurrence number from the first time period into the second time period by determining, for example, the channel having the smallest event occurrence number as the first priority order and the channel having the second-smallest event occurrence number as the second priority order, etc. Consequently, when the capacity of the image signals is large and thus all the channels have a memory region capacity excess, the pre-recording performance time period of all the channels is changed from the first time period into the second time period.

Figure 5:
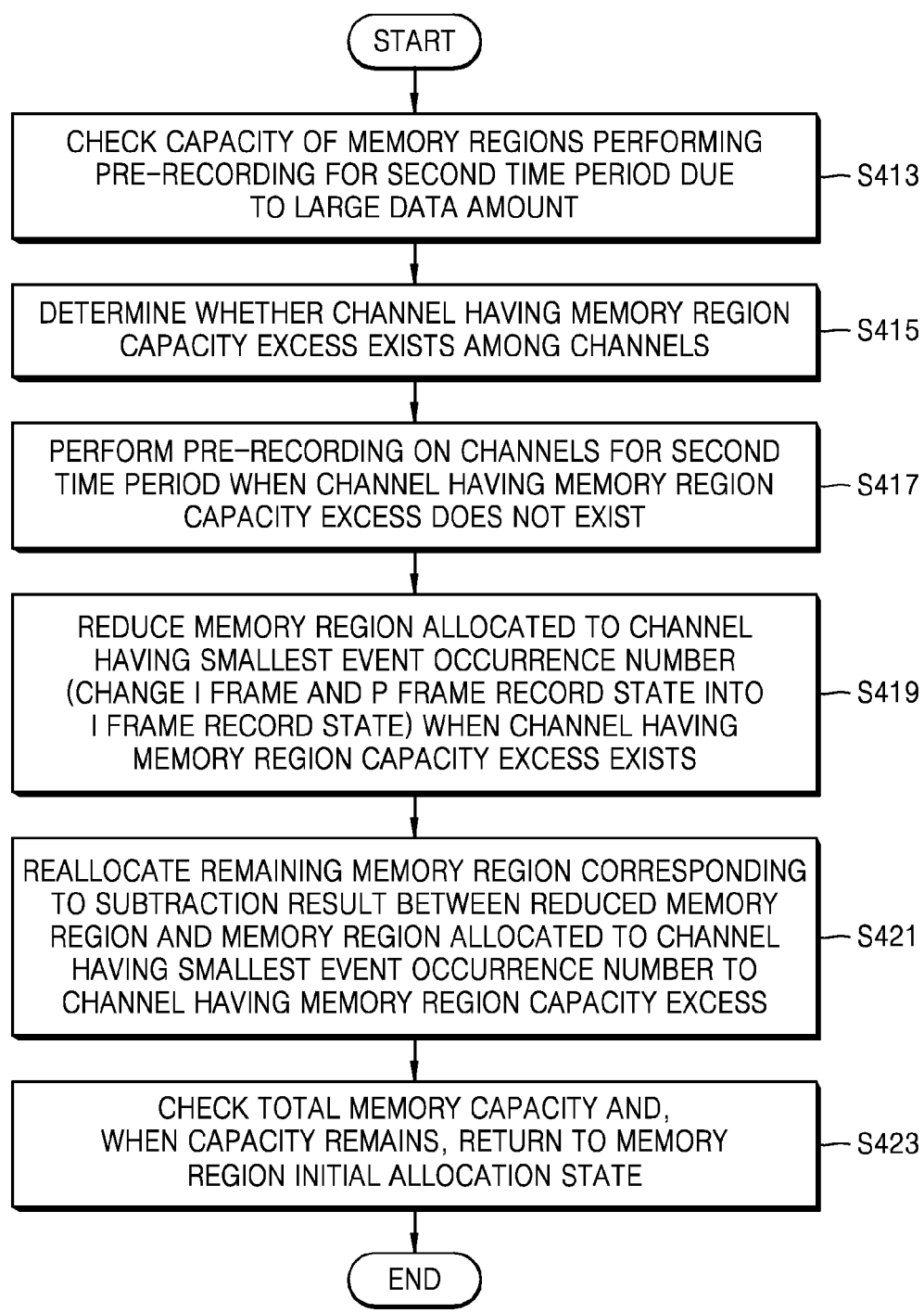

FIG. 5 is a diagram illustrating a method of reallocating the memory regions after the pre-recording performance time period is changed into the second time period. Referring to FIG. 5, the image signal processing unit 100 may perform operation S413 of checking the capacity of the memory regions performing pre-recording for the second time period.

Also, the image signal processing unit 100 may perform an operation of checking the channel having the smallest event occurrence number.

As a result of checking the capacity of the memory regions, when the channel having a memory region capacity excess does not exist in operation S415, the image signal processing unit 100 may perform operation S417 for maintaining the current states of all the channels, that is, performing pre-recording for the second time period.

On the other hand, as a result of checking the capacity of the memory regions, when the channel having a memory region capacity excess exists in operation S415, the image signal processing unit 100 may perform operation S419 of reducing the memory region allocated to the channel having the smallest event occurrence number. Herein, the reducing of the memory region allocated to the channel having the smallest event occurrence number may include changing the record state of the image signal including the I frame and the P frame into the record state of I frame image signal with respect to the channel having the smallest event occurrence number and performing pre-recording for the second time period.

When the reducing of the memory region allocated to the channel having the smallest event occurrence number is completed, the image signal processing unit 100 may perform operation S421 of reallocating the remaining memory region corresponding to the subtraction result between the reduced memory region and the memory region allocated to the channel having the smallest event occurrence number to the channel having the memory region capacity excess.

Thereafter, the image signal processing unit 100 may perform operation S423 of checking the total memory capacity and, when the capacity remains, returning to the state before the memory region reallocation.

Figure 6:
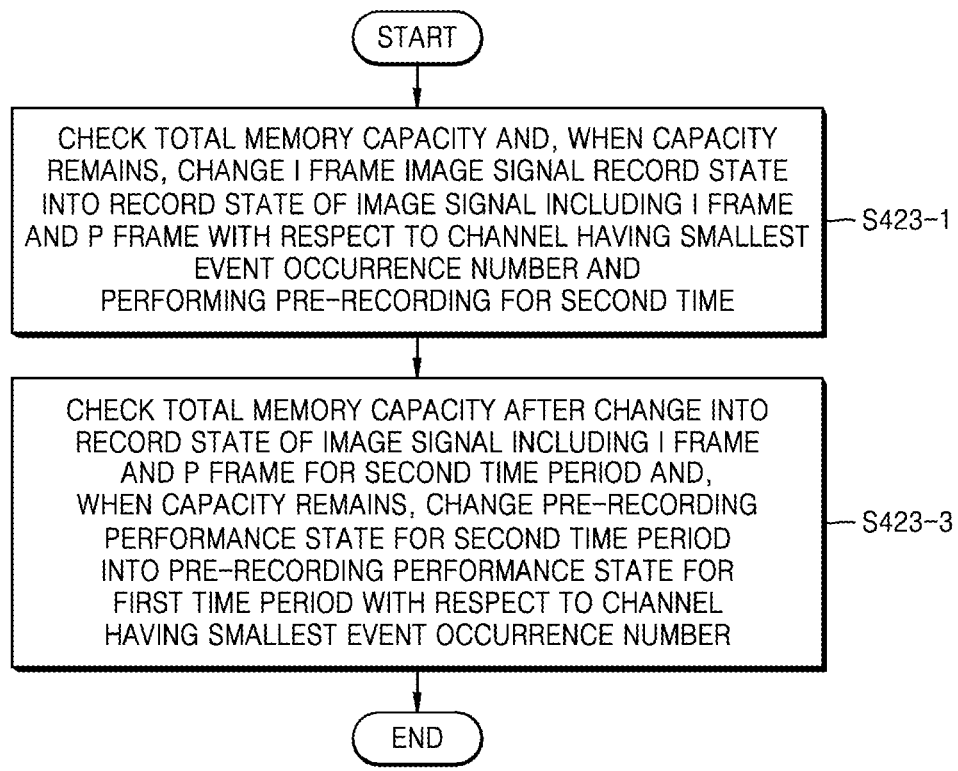
FIG. 6 is a flow diagram illustrating a method of returning to a memory region initial allocation state in FIG. 5.

FIG. 6 illustrates a method of returning to the state before the memory region reallocation. Referring to FIG. 6, the image signal processing unit 100 may perform operation S423-1 of checking the total memory capacity and, when the capacity remains, changing the pre-recording performance state for the second time period by changing the record state of the I frame image signal into the record state of the image signal including the I frame and the P frame for the second time period with respect to the channel having the smallest event occurrence number.

Then, the image signal processing unit 100 may perform operation S423-3 of checking the total memory capacity after the change into the pre-recording performance state for the second time period, maintaining the current state in the case of no remaining capacity, and, when the capacity remains, changing the pre-recording performance state for the second time period into the pre-recording performance state for the first time period with respect to the channel having the smallest event occurrence number.

The image signal storing methods according to the inventive concept may also be embodied as computer-readable codes on a computer-readable recording medium. The computer-readable recording medium may include any data storage device that may store data which may be thereafter read by a computer system. Examples of the computer-readable recording medium may include read-only memories (ROMs), random-access memories (RAMs), compact disk read-only memories (CD-ROMs), magnetic tapes, floppy disks, and optical data storage devices. The computer-readable recording medium may also be distributed over network-coupled computer systems so that the computer-readable codes may be stored and executed in a distributed fashion. Also, functional programs, codes, and code segments for accomplishing the inventive concept may be easily construed by programmers skilled in the art to which the inventive concept pertains.

The inventive concept has been particularly shown and described with reference to exemplary embodiments thereof. However, those of ordinary skill in the art will understand that various changes in form and details may be made therein without departing from the spirit and scope of the inventive concept as defined by the following claims. Thus, the exemplary embodiments should be considered in descriptive sense only and not for purposes of limitation. Therefore, the scope of the inventive concept may be defined not by the above detailed descriptions but by the following claims, and all differences within the scope will be construed as being included in the inventive concept.

The invention claimed is:

1. A method for storing an image, the method comprising:
dividing a memory into a plurality of memory regions having equal sizes, and allocating the memory regions having the equal sizes to a plurality of channels;
pre-recording image signals input through the channels in the memory regions, respectively, for a first time period or a second time period shorter than the first time period, when events occur;
counting an event occurrence number from the image signals for a predetermined time period;
reallocating the memory regions to the channels according to the event occurrence number and a recording state of the image signals in the memory regions; and
storing the image signals pre-recorded in the memory regions, in a storage.

2. The method of claim 1, wherein the reallocating the memory regions comprises:
checking capacities of the memory regions which pre-record the image signals for the first time period or the second time period;
detecting a channel, among the channels, having the smallest event occurrence number;
reducing a memory region allocated to the detected channel if there exists a channel having a predetermined capacity exceeded in a memory region allocated to the channel; and
reallocating a size of the reduced memory region allocated to the detected channel to the channel having the predetermined capacity exceeded.

3. The method of claim 2, wherein the reducing the memory region allocated to the detected channel comprises changing a pre-recording time period for the detected channel from the first time period to the second time period.

4. The method of claim 3, wherein the reducing the memory region allocated to the detected channel further comprises changing a recording state of an image signal input through the detected channel from intra (I) frame and predictive (P) frame recording to I frame recording.

5. The method of claim 2, further comprising:
checking a total capacity of the memory; and
if the total capacity of the memory remains, returning the memory to a state before the memory regions are reallocated.

6. The method of claim 5, wherein the returning to the state before the memory regions are reallocated, if the total capacity of the memory remains, comprises:
if the total capacity of the memory remains, changing a recording state of an image signal input through the detected channel from intra (I) frame recording to I frame and predictive (P) frame recording, and setting or changing a pre-recording time period for the detected channel to the second time period;
checking the total capacity of the memory after the changing the recording state of the image signal to the I frame and P frame recording and the setting or changing the pre-recording time period for the detected channel to the second time period, and if the total capacity of the memory still remains, changing the pre-recording time period for the detected channel from the second time period to the first time period.

7. The method of claim 1, wherein the counting the event occurrence number comprises allocating a weight to each event and counting the event occurrence number according to the weight.

8. An apparatus for storing an image, the apparatus comprising:
at least one processor configured to implement:
a controller which divides a memory into a plurality of memory regions having equal sizes, allocates the memory regions having the equal sizes to a plurality of channels, and pre-records image signals input through the channels in the memory regions, respectively, for a first time period or a second time period shorter than the first time period, when events occur;
an event processor which counts an event occurrence number from the image signals for a predetermined time period; and
a dynamic memory allocator which reallocates the memory regions according to the event occurrence number and a recording state of the image signals in the memory regions,
wherein the controller stores the image signals pre-recorded in the memory regions, in a storage.

9. The apparatus of claim 8, wherein the dynamic memory allocator:
checks capacities of the memory regions which pre-record the image signals for the first time period or the second time period,
detects a channel, among the channels, having the smallest event occurrence number,
reduces a memory region allocated to the detected channel if there exists a channel having a predetermined capacity exceeded in a memory region allocated to the channel, and
reallocates a size of the reduced memory region to the channel having the predetermined capacity exceeded.

10. The apparatus of claim 9, wherein the dynamic memory allocator changes a pre-recording time period for the detected channel from the first time period to the second time period.

11. The apparatus of claim 10, wherein the dynamic memory allocator changes a recording state of an image signal input through the detected channel from intra (I) frame and predictive (P) frame recording to I frame recording.

12. The apparatus of claim 9, wherein the dynamic memory allocator checks a total capacity of the memory, and, if the total capacity of the memory remains, returns the memory to a state before the memory regions are reallocated.

13. The apparatus of claim 12, wherein the dynamic memory allocator:
  checks the total capacity of the memory, and, if the total capacity of the memory remains, changes a recording state of an image signal input through the detected channel from intra (I) frame recording to I frame and predictive (P) frame recording, and sets or changes a pre-recording time period for the detected channel to the second time period; and
  checks the total capacity of the memory after the recording state of the image signal is changed to the I frame and P frame recording and the pre-recording time period for the detected channel is set or changed to the second time period, and, if the total capacity of the memory still remains, changes the pre-recording time period for the detected channel from the second time period to the first time period.

14. The apparatus of claim 8, wherein the event processor allocates a weight to each event and counts the event occurrence number according to the weight.

15. An apparatus for storing an image, the apparatus comprising:
  at least one memory; and
  at least one processor configured to implement:
    a controller which divides the memory into a plurality of memory parts having equal sizes, allocates the memory parts having the equal sizes to a plurality of channels, and pre-records image signals input through the channels in the memory parts for different time periods, when events occur, respectively;
    an event processor which checks characteristics of the image signals input through the channels; and
    a dynamic memory allocator which changes an attribute of at least one of the channels or at least one of the memory parts to which the channels are allocated, respectively, according to a result of the characteristics checking.

16. The apparatus of claim 15, wherein the attribute comprise at least one of a size of the memory part, a pre-recording time set for the channel or the memory part, a recording attribute of an image signal for the memory part through the channel.

17. The apparatus of claim 16, wherein the dynamic memory allocator detects a channel having a predetermined characteristic from among the channels, and changes at least one of a size of a memory part allocated to the detected channel, a pre-recording time set for the detected channel, and a recording attribute of an image signal for the detected channel.

18. The apparatus of claim 17, wherein the recording attribute of the image signal comprises at least one of a number of image frames recorded in a unit of a time and a type of image frame to be input through the detected channel.

19. The apparatus of claim 15, wherein the characteristics of the image signals comprise a number of event occurrence in each of the image signals input through the channels, respectively, for a predetermined time period.

* * * * *